May 12, 1959
W. A. JUERGENS
2,885,691
SINK RETAINER
Filed Feb. 28, 1958
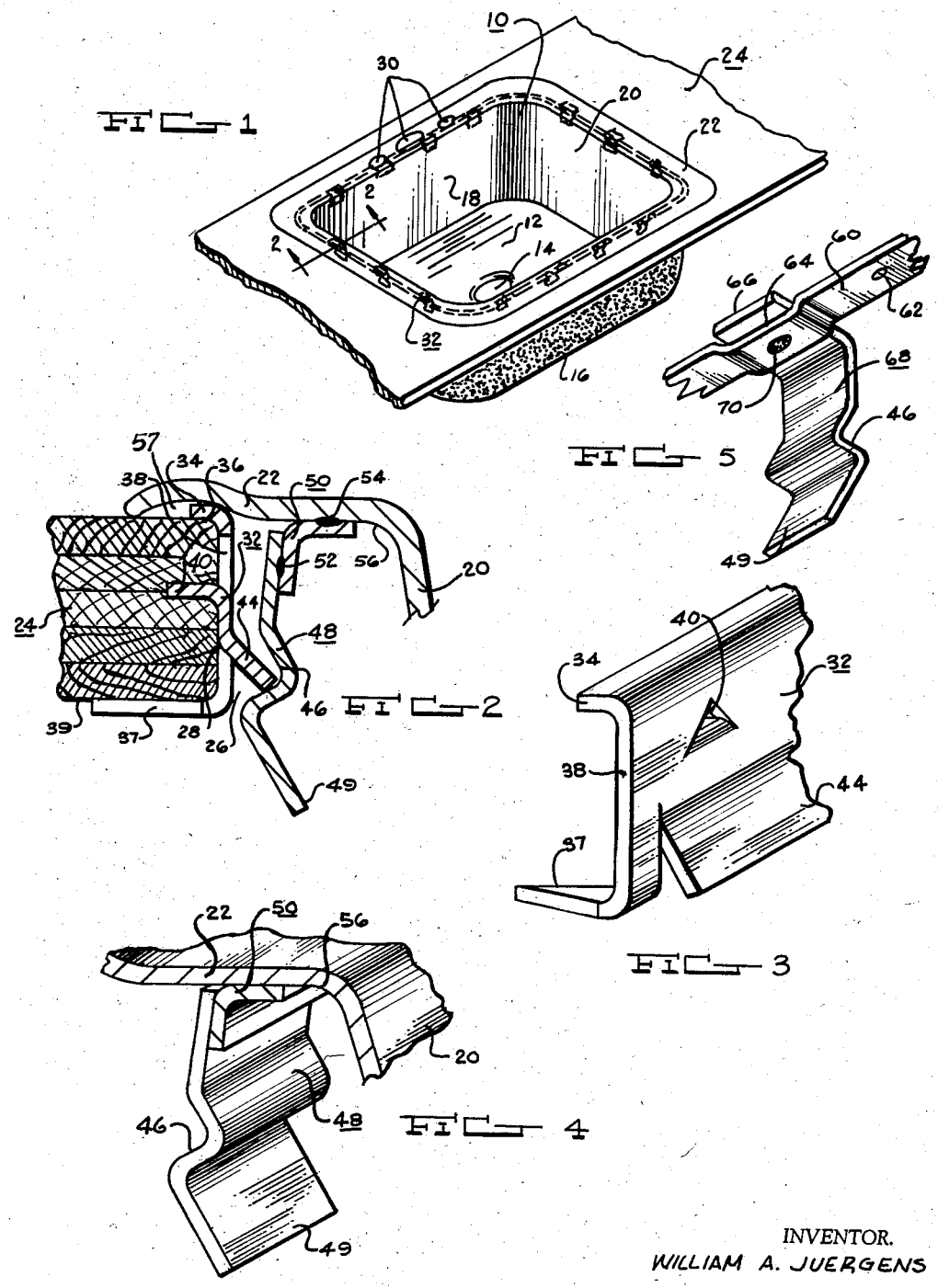
INVENTOR.
WILLIAM A. JUERGENS
BY
SMITH, WILSON, LEWIS & McRAE

United States Patent Office 2,885,691
Patented May 12, 1959

2,885,691

SINK RETAINER

William A. Juergens, Grosse Pointe Woods, Mich.

Application February 28, 1958, Serial No. 718,198

2 Claims. (Cl. 4—187)

This invention relates to the mounting of household appliances having substantially flat outer flanges such as sinks, lavatories, burners for stoves and other such devices in a larger substantially flat surface, such for example as in a counter or sink top. More particularly my invention pertains to the development of an improved method of mounting appliances in such a manner that it is unnecessary to gain access to the space beneath the appliance to install it securely in place in a substantially flat counter top surface.

In the installation of sinks and other such devices having surrounding flanges mounted in substantially flat surfaces to provide a flat working area of desired proportions surrounding the device, it has been necessary for a workman to gain access to the space beneath the appliance to position and manipulate the fasteners required to secure the device in place. This practice has resulted in a wasting of space because it has been impossible to position the appliance close to a vertical wall or to another appliance, space being required to accommodate the necessary fastening devices and to permit the workman to secure the fasteners in place. It has also been difficult for a workman to function efficiently while installing such appliances in locations where space is crowded.

An object of my invention is to provide a mounting for appliances having flat outer flanges adapted for alignment in larger substantially flat surfaces in such a manner that all of the required fastening devices may be positioned and secured in place from above the appliance.

A further object of this invention is to provide an appliance fastening construction wherein it is unnecessary for the workman to gain access to the space beneath the appliance either to install the attaching or holding members or to position the appliance securely in place.

Another object of my invention resides in the use of cooperating clamp members, one set of which is installed on the vertical edge of the cut out member forming the flat surface into which the device is to be mounted, and the other set of which is secured to the lower surface of the horizontal flange of the appliance or device being installed for snap engagement in a retaining position with respect to the first mentioned set of clips.

Yet a further object of my invention is to provide a simplified method of securing a sink in a sinkboard in such a manner that the cost of installing the sink is materially reduced, and whereby when occasion demands the sink can be readily removed.

Still a further object is to provide a simplified sink holding construction wherein spaced clips may be inserted in the vertical edge of the counter cut out portion to be engaged by spring clip members carried by the lower edge of the sink flange.

Other objects and advantages of my invention will be apparent from the following detailed description, considered in connection with the accompanying drawings submitted for purposes of illustration only and not intended to define the scope of the invention, reference being had for that purpose to the subjoined claims.

In the drawings wherein similar reference characters refer to similar parts through the several views.

Fig. 1 is a perspective view illustrating my improved device for securing appliances in place, shown as applied to the installation of the sink in a counter top or sinkboard.

Fig. 2 is a fragmentary sectional view taken substantially on the line 2—2 of Fig. 1, looking in the direction of the arrows.

Fig. 3 is a view in perspective showing the clip adapted to be positioned in the vertical edge of the cut out portion of the sinkboard or counter top.

Fig. 4 is a perspective view of the retaining clip adapted to be secured to the lower surface of the horizontal flange surrounding a sink or other appliance.

Fig. 5 is a perspective view of a modified form of clip adapted to be secured to the lower surface of the flange of the appliance being installed.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now more particularly to Fig. 1 it will be noted that my invention is illustrated as applied to an appliance of the sink type 10 having a bottom wall 12 provided with an outlet opening 14, a front wall 16 and a back wall 18 cooperating with end walls 20 to form a sink receptacle. The vertically extending walls 16, 18 and 20 terminate in a substantially flat outwardly extended flange 22 adapted to overlie the upper marginal edge of a counter top or sinkboard 24 having a cut out section 26 defining a vertical wall 28 as illustrated in Fig. 2, for the reception of the sink 10.

It will be noted that the outer flange 22 extending substantially perpendicularly with respect to the back wall 18 is provided with a plurality of apertures 30 for the reception of suitable plumbing fixtures.

In the installation of the sink or other appliance by my improved fastening device and method, it will be noted that I employ a plurality of spaced clips 32 as illustrated in Figs. 2 and 3. These clips 32 are secured in the vertical wall 28 defining the cut out section 26 of the sinkboard 24. The clips 32 have flat top walls 34 to overlie and engage the upper surface 36 of the sinkboard 24 and a vertical surface 38 to engage the vertical wall 28 of the cut out portion 26 of the sinkboard 24.

Means may be employed to secure the clips 32 in the vertical wall 28 of the cut out portion 26 of the sinkboard 24. One desirable form of securing means consists of a pierced out section 40 of the vertical surface 38 to project into the wall 28 and hold the clips 32 in place therein. The clips 32 have a plurality of spaced pointed projections 37 adapted to underlie the lower surface 39 of the sink or counter top 24. If a counter or sink top 24 of greater thickness than the standard ¾" counter top is encountered the pointed projections 37 may be driven into the vertical edge to more securely hold the clips 32 in place. It will of course be apparent that nails, clips or other fasteners may be employed to hold the clips 32 in place.

It will be noted that the clips 32 have pierced out sections 44 extending angularly relative to the vertical surface 38 of the clip 32 to project into the lower contoured pocket 46 adjacent the lower end of the clamps 48 as illustrated in Figs. 2, 4 and 5.

The clamps 48 may be secured in any desired manner to the lower surface 56 of the flange 22 as by brackets 50 spot welded or otherwise secured thereto, as illustrated at 52 and 54 in Fig. 2.

In the utilization of my invention in installing an appliance such as a sink in a counter top or sinkboard, the contour of the sink within the confines of the outer flange 22 is marked on a sinkboard 24 and the sinkboard 24 is cut in any convenient manner to provide an aperture therein for the reception of the sink or other appliance. A plurality of clips 32 are then secured in the vertical wall 28 defining the cut out section 26 of the sinkboard 24 at spaced points around the edge corresponding with the spacing of the clips 48 on the lower surface of the flange 22 for the reception of the sink. The upper walls 34 of the clips 32 are aligned with the upper surface 36 of the sinkboard 24 to locate the sink vertically. The clips 32 are secured in place by tapping them to project their pierced out prong 40 into the sinkboard 24 as illustrated in Fig. 2 to secure the clips in place.

It will also be noted that where the clamps 48 are welded or otherwise secured to the lower surface 56 of the outer flange 22 before the sink is delivered to the user, the cut out portion 26 in the sinkboard 24 is proportioned to dispose the clips 32 in proper spaced relation relative to the edge of the sink 10 that they can be engaged by the clamps 48 when the sink 10 is moved to the clamping position therein. Where the clamps 48 are secured in place prior to delivery of the sink a template or other marking device can be employed to accurately locate the size and contour of the hole 26 to be cut in the counter top 24.

In the installation of the sink, after the properly sized hole 26 has been cut in the sinkboard or counter top 24 the clips 32 are inserted and are secured in place. The outer edge of the lower surface 56 of the outer flange 22 is treated with calking material as shown at 57, and after the necessary adjustments have been made to check the proper alignment of the clips 32 positioned in the cut out section 26 of the sinkboard 24 with the clamps 48 carried by the outer flange 22 of the sink 10, the sink is depressed downwardly whereupon the pierced out sections 44 of the clips 32 engage the contoured wall 46 of the clamps 48 whereupon the sink is securely held in place.

It will be noted that in the installation of the sink by my improved method, it is unnecessary for the workman to do any thing from the underside of the sink or countertop, the clips 32 being inserted from above, and the sink being installed by merely depressing it through the cut out section 26 in the sinkboard or counter top 24.

Referring to Fig. 5 it will be noted that a modified form of my invention is illustrated. An elongated strip 60 may be secured to the lower surface 56 of the flange 22 of the sink or other appliance as by spaced spot welds 62. The strip 60 may be formed with spaced contoured sections 64 to receive contoured sections 66 of clamps 68 generally similar to the clamps 48 discussed previously. In the operation of this embodiment the sink or other appliance can be formed with strips 60 secured to the lower surface of the outwardly extending flange 22. When the sink or other appliance is ready for installation the workman can position a desired number of clamps 68 in operative position in the strips 60, the indentations 70 engaging in depressions in the contoured sections 66 of the clamps 68 to hold the clamps in place. The clips 32 in the cut out section 26 of the sinkboard 24 may be positioned to conform with the spacing of the clamps 68.

It will be apparent that the clips 32 adapted to be positioned in the vertical edge of the sinkboard or counter top 24 may be of any desired length. An elongated strip having a plurality of pierced out sections 40 to provide spaced prongs to secure the elongated clip 32 in place may be employed. Conversely the clamps 48 carried by the lower surface of the outer flange of the sink or other appliance may be relatively short. It will also be apparent that if desired rounded clamps and clips on the sink or other appliance and on the vertical edge of the sinkboard may be employed for use at the corners. If desired relatively short clips and clamps may be employed to engage each other at the corners without undesirable binding regardless of the angular curvature of the corner.

It will be noted that the clamps 48 have elongated lower sections 49 which may be grasped and deflected inwardly toward the sink away from the pierced out sections 44 of the clips 32 to permit the releasing of the clamps when it is desired to remove the sink or other appliance from the counter or sinkboard 24.

I claim:

1. The combination with an appliance having vertically extending side walls terminating in a substantially flat horizontal outer flange to overlie the marginal edges of a counter top in the area of a cut out portion therein, the flange having downwardly extended clamps defining pockets opening laterally outwardly from the side walls of the appliance, of clips secured to the marginal edges of a counter top in the area of a cut out portion therein and having downwardly and inwardly directed projections to extend into the outwardly opening pockets of the clamps carried by the flange of the appliance.

2. An assembly of an appliance and attaching clips adapted for clamping engagement in a cut out portion of a substantially flat surfaced member, the appliance having a substantially flat outer flange adapted to overlie the marginal edge of the substantially flat surfaced member in the area of the cut out portion and having downwardly extended contoured clamps defining pockets opening laterally outwardly, and the clips having downwardly and inwardly directed projections to extend into the outwardly opening pockets of the clamps carried by the flange of the appliance, the clamps having actuating portions extending beneath the projections of the clips when assembled in said pockets whereby the clamps can be deflected angularly to release the clips.

References Cited in the file of this patent

UNITED STATES PATENTS

| 1,727,159 | Coulter | Sept. 3, 1929 |
| 2,478,060 | Spiess | Aug. 2, 1949 |
| 2,584,581 | Harris | Feb. 5, 1952 |
| 2,757,421 | Toney | Aug. 7, 1956 |
| 2,778,032 | Meehan | Jan. 22, 1957 |
| 2,793,071 | Meyer | May 21, 1957 |
| 2,822,898 | Richards | Feb. 11, 1958 |